UNITED STATES PATENT OFFICE.

CARL A. PFANSTIEHL, OF WAUKEGAN, ILLINOIS, ASSIGNOR TO PFANSTIEHL COMPANY, A CORPORATION OF ILLINOIS.

PROCESS OF FORMING ABRASIVE WHEELS AND PRODUCT THEREOF.

1,210,358. Specification of Letters Patent. Patented Dec. 26, 1916.

No Drawing. Application filed May 4, 1914. Serial No. 836,384.

*To all whom it may concern:*

Be it known that I, CARL A. PFANSTIEHL, a citizen of the United States, residing at Waukegan, in the county of Lake and State of Illinois, have invented certain new and useful Improvements in Processes of Forming Abrasive Wheels and Products Thereof, of which the following is a full, clear, concise, and exact description.

My invention relates to abrasives, and more particularly the process of forming an abrasive substance, preferably in the form of a wheel, for cutting or sawing extremely hard substances such, for example, as the rare metals of which tungsten is a typical example.

My invention relates also to the product resulting from the practice of the new art.

It is the more specific object of my invention to produce a very thin abrasive wheel, as for example, a wheel having a thickness of from 10/1000 to 15/1000 of an inch, which wheel may be used in cutting or sawing thin disks of tungsten from the end of a tungsten rod, as described, for example, in my pending application for United States Letters Patent, Serial No. 830,013, filed April 6th, 1914.

Metallic tungsten is an exceedingly hard and an exceedingly tough and difficult material to work. It is almost impossible to machine it at all with the tools heretofore employed in working metals. It is almost impossible to cut or grind it with the abrasive wheels heretofore manufactured. When it is attempted to cut or grind metallic tungsten with abrasive wheels of the prior art, the abrasive wheels themselves are very quickly worn out and destroyed. By means of my invention I have produced abrasive wheels of about 4 inches in diameter and having a thickness of from 10/1000 to 15/1000 of an inch. I have found it possible to mount and drive these wheels in a properly constructed grinding head and with them to cut or saw hundreds of thin tungsten disks from the end of a tungsten rod of approximately 1/8 of an inch in diameter before the abrasive wheel becomes worn to such an extent that it must be discarded. I have discovered that these results can be secured by embedding carborundum or, preferably, alumina ($Al_2O_3$) crystals or granules of approximately 100 mesh in a bond of vulcanized rubber impregnated with fine flour of carborundum or alumina, and by coating the sides of the wheels with carborundum or alumina granules or flour embedded in sodium silicate.

Details of the process and the structure of the resulting product will be more clearly understood from the following detailed description of the steps employed in the process:—

I put pure or substantially pure Pará rubber gum into a pot or vessel, preferably water or steam jacketed, and heated to a temperature of about 200° Fahrenheit. The temperature will vary somewhat with different samples of gum, but should be sufficient to make the rubber soft; and although the rubber does not become exactly liquid, it does become soft enough to enable powdered solid material to be intermixed with it. To the softened rubber I add powdered sulfur in approximately the proportions of 67 per cent. rubber and 33 per cent. powdered sulfur by weight. The sulfur and rubber are thoroughly mixed or kneaded together in the heated vessel. Of this mixture I take 20 per cent. by weight and add 80 per cent. by weight of the granules of the abrasive material, preferably alumina. The alumina thus added is preferably a mixture of 80 per cent. 100 mesh alumina granules or grain and 20 per cent. "flour" of alumina of 250 mesh and finer.

The alumina is intimately kneaded into the mixture of rubber and sulfur in the heated vessel above-described. It is my idea that the flour or alumina fills in the pores and interstices between the particles of rubber and, in appearance at least, becomes an intimate part of the rubber compound. After these ingredients have been thoroughly intermixed and kneaded together, the mixture is cooled sufficiently to permit handling. I take from the heated vessel a quantity of the rubber and abrasive mixture. The material is quite strongly adhesive and may be shaped in the hands into the form of a ball somewhat as a quantity of putty may be shaped into a ball. The ball of rubber and abrasive mixture is then fed between a pair of revolving rollers, preferably of hard and very smooth steel, the rollers being heated to a temperature of approximately 170° Fahrenheit. The ball of rubber and abrasive mixture is rolled into a sheet of a thickness depending upon the size of the ball fed between the rollers, and depending also upon the length of the rollers. The rollers are then moved together and the sheet is again fed between them. This rolling and rerolling is continued to work down the thickness of the sheet of rubber and abrasive material. It will be found that the rollers can be cooled somewhat after the thickness of the sheet is decreased. I have found it desirable to keep the rollers at the lowest temperature which will work the material without cracking it. After the sheet has been rolled down to a thickness of 1/16 of an inch or less the rolls are barely warm to the touch. The sheet is rolled down to a thickness of 10/1000 to 15/1000 of an inch. This thin sheet of material is then laid on a flat steel plate, preferably dusted with powdered soapstone to prevent the material from sticking to the plate. The circular disks, in the form of abrasive wheels with holes through their centers for mounting on the arbors of the grinding machine, are then cut from the sheet, preferably with a cutter like that employed by a baker in cutting doughnuts, care being exercised, however, that the cutter have sufficient rigidity to maintain the perfect circularity of the cutting edges.

The annular disks cut from the sheet of material as above-described are then placed upon a flat steel plate or plates dusted with powdered soapstone. The steel plate or plates bearing the annular disks of uncured rubber and abrasive mixture are then placed in a curing or vulcanizing oven in which the temperature at the outset should be approximately 250° Fahrenheit. The disks remain in this oven for a period of from eight to ten hours, during which time the temperature is gradually increased to approximately 310° Fahrenheit. This operation of curing or vulcanizing will harden and stiffen the disks and when cooled they may be employed in an appropriate grinding head for cutting or slitting metallic tungsten. I have found, however, that these disks as above formed will wear down quite rapidly at the edges when it is attempted to use them in cutting tungsten disks from the end of a metallic tungsten rod. The periphery of the wheel becomes very much rounded when used for a short time. The wheel then tends to wedge itself into the slit which it cuts. It then heats and rapidly disintegrates, with the result that but very little work can be performed with a single wheel, for its usefulness is destroyed. This tendency to wear round on the edges is very much greater in a very thin wheel than in the case of a thicker wheel. I have, however, discovered a means for overcoming the difficulty on this score. I have found that by coating disks in a 16° Bé. solution of sodium silicate mixed with carborundum or alumina flour of 250 mesh and less, the difficulty is overcome. The important thing is to coat the sides of the wheels with this mixture of sodium silicate and abrasive mixture. I prefer to paint the sodium silicate mixture upon the sides of the wheels with a brush before putting them into the vulcanizing or curing oven, although I have found that the wheels may be successfully coated with the silicate of sodium mixture or solution after the disks have been cured or vulcanized. It is necessary to permit the silicate of sodium solution or mixture to dry upon the surfaces of the wheel, and this drying is effectively accomplished during the process of vulcanization in case the wheels are coated before curing.

The silicate of sodium forms a hard glassy surface upon either side of the wheel. The granules of abrasive material embedded within the glassy silicate of sodium scratch or grind away the metallic tungsten at the edges of the slit which is cut by the revolving wheel. The glass-like texture of the bond in which these abrasive granules are embedded at either side of the wheel holds up the edges of the wheel so that they do not wear away with great rapidity as would otherwise be the case. The silicate of sodium would not have the strength to serve as a bond for the entire mass of the wheel, but when supported by the rubber core of the wheel its hard glass-like nature seems to supply the element necessary to hold up the edges of the wheel when used in cutting or slitting metallic tungsten. It is not essential that the abrasive mixture employed in the construction of these wheels be carborundum alone or alumina alone. I have found, for example, that mixtures of these two abrasives in various proportions will give very satisfactory results in working metallic tungsten. It is exceedingly important in using these wheels to cut a tungsten rod, to prevent all vibration or chatter both of the rotating wheel and of the tungsten rod from which the disks are to be cut. I have found it important also when operating the wheels to cut metallic tungsten, to lubricate the wheels and the work by supplying a lubricant in large quantities, preferably in the form of a stream played constantly upon the work. I have found kerosene to operate satisfactorily for this purpose. I have secured satisfactory results also by using as a lubricant a commercial lubricating paste known to the trade as Economy grinding lubricant, or, even better, this paste mixed with approximately 10 per cent. of kerosene.

Experience has shown that abrasive wheels manufactured as above described, with the larger crystals or granules of the abrasive mixture embedded in the hard rubber bond which bond itself is filled or impregnated with crystals or granules of very much smaller size and with the sides of the wheels coated with the abrasive granules or crystals embedded in a hard glassy bond such, for example, as silicate of sodium, will give most excellent service in grinding, cutting or slitting metallic tungsten when mounted in a grinding head which will rotate the wheel without vibration, when also the metallic tungsten to be cut is so firmly held or gripped as to be free from vibration, and when also the work is supplied with a stream of lubricant particularly adapted for the purpose, as above-described. I am not aware that it has been heretofore possible to secure these results.

What I claim as new and desire to secure by Letters Patent of the United States is:—

1. The process which consists in mixing rubber gum, sulfur and granules of an abrasive material, forming the mixture into an annular disk of substantially uniform thickness, and coating the surfaces of the disk with a mixture of glassy binder and an abrasive in granular form.

2. The process which consists in mixing rubber gum, sulfur, and granules of an abrasive material, forming the mixture into an annular disk of substantially uniform thickness, and coating the surface of the disk with a mixture of sodium silicate and a granular abrasive.

3. The product which consists of an annular disk of granules of an abrasive material embedded in a binder, and granules of abrasive material embedded in a coating of sodium silicate adhering to the sides of said annular disk.

In witness whereof, I hereunto subscribe my name this 1st day of May, A. D. 1914.

CARL PFANSTIEHL.

Witnesses:
ALBIN C. AHLBERG,
ROBERT F. BRACKE.